Aug. 14, 1951   G. H. RAMSEY   2,564,212
POWER CONVERTER
Filed May 8, 1948   3 Sheets-Sheet 2
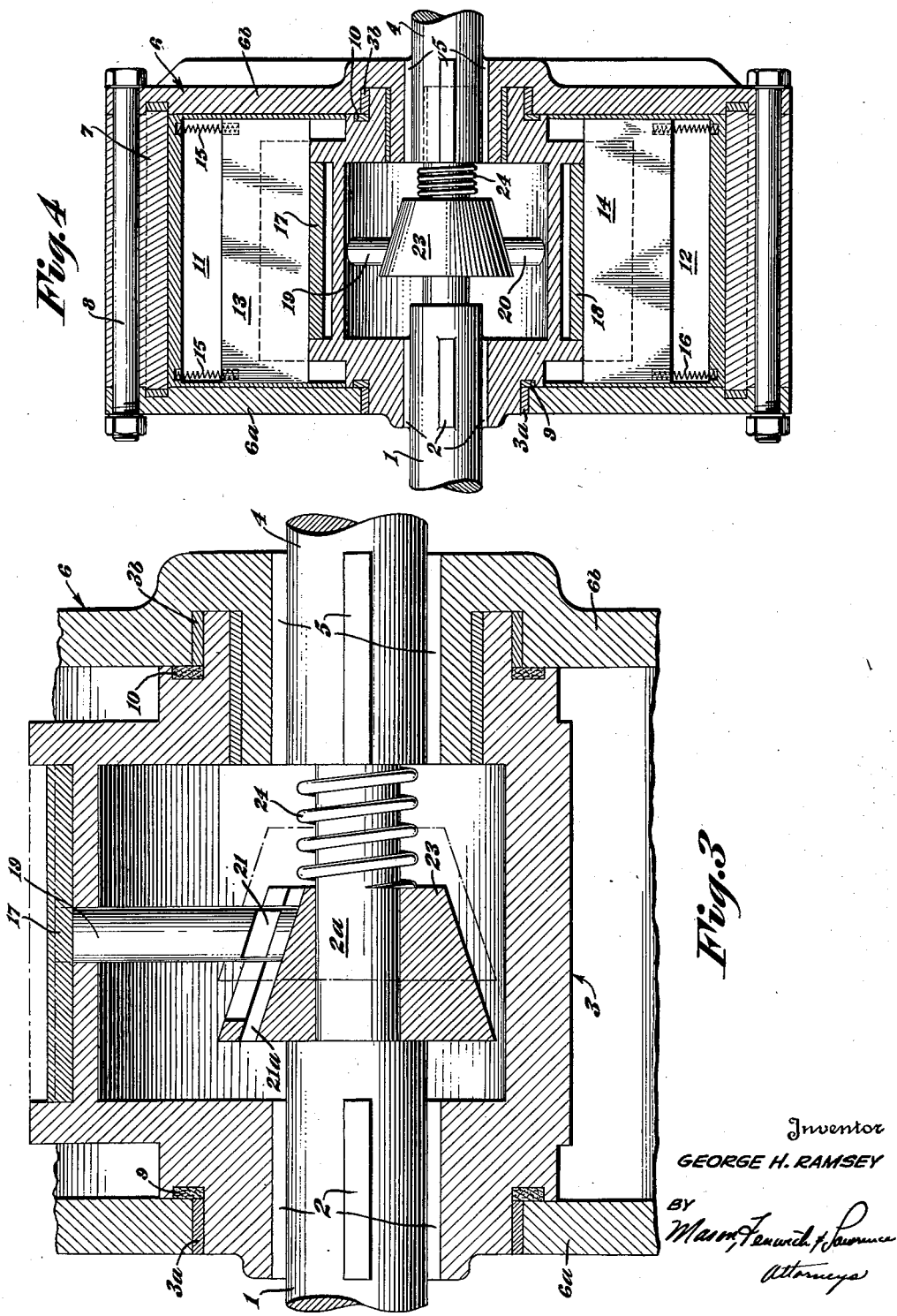
Inventor
GEORGE H. RAMSEY Aug. 14, 1951  G. H. RAMSEY  2,564,212
POWER CONVERTER Filed May 8, 1948  3 Sheets-Sheet 3

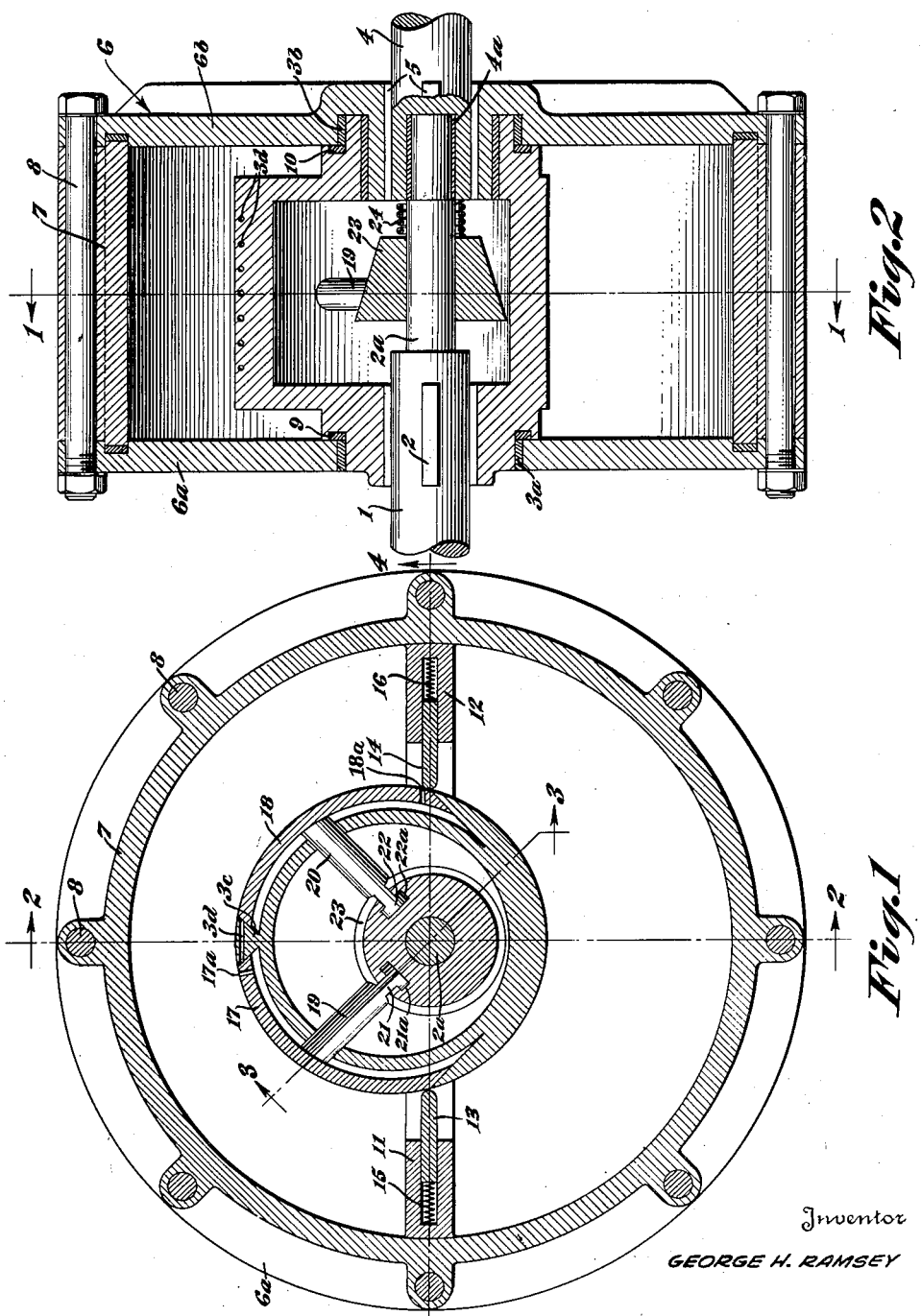

Inventor
GEORGE H. RAMSEY

Patented Aug. 14, 1951

2,564,212

UNITED STATES PATENT OFFICE 2,564,212

POWER CONVERTER

George H. Ramsey, Rolla, Mo.

Application May 8, 1948, Serial No. 25,970

7 Claims. (Cl. 192—58)

This invention relates to a power converter; more specifically, to hydraulic apparatus having the combined function of a clutch and transmission and which is useful in automobiles and similar mechanisms.

The use of hydraulic clutches for automobiles and the like and the advantages obtained thereby, such as smooth acceleration, are well known. Many attempts have been made to simplify the construction of the driving mechanism of an automobile, but in most instances a separate clutch and transmission are required. Transmissons of the well-known type are usually jerky in operation and much is to be desired in the way of improvement to provide smooth acceleration, particularly when starting from a standstill. While automatic transmissions have been devised, these are generally cumbersome and expensive in construction and involve large numbers of parts requiring frequent servicing.

An object of the present invention is to provide a combined hydraulic clutch and transmission device in a single unit of relatively simple construction and which is devoid of the above-named disadvantages of well-known structures.

A more specific object of my invention is to provide a hydraulic transmission and clutch mechanism which converts rotating mechanical power of any speed and torque into a power of lower rotative speed and higher torque.

A still more specific object of my invention is to provide a hydraulic clutch and transmission unit including sliding piston-like blocks which unit operates on the principle of pressure balance between centrifugal force of the sliding blocks against oil pressure developed in the unit by a rotating eccentric which transmits torque to the driven shaft in the form of a series of liquid pressure impulses.

The invention in its broadest aspects comprises a rotating eccentrically mounted drum connected to a driving shaft, which drum is contained within a larger outside drum that is connected to the driven shaft, the space between the drums being filled with oil or other suitable hydraulic fluid. A pair of substantially radially extending slidable plates are provided between the drums and arranged so that they will always close the gap between the rotating eccentric and the outside drum irrespective of the position to which the eccentric is rotated, so as to continuously form two separate chambers whose volumes are alternately increased and decreased in succession causing pressure surges in the oil which are transmitted to the slidable plates and, in turn, to the outside drum and driven member. To obtain greater torque, as in the case of starting a vehicle, it is necessary merely to allow the driving member and rotating eccentric to operate at higher speed which, in turn, causes faster pressure impulses and develops greater centrifugal force on the radially outwardly slidable blocks.

Other objects and advantages will become apparent from the study of the specification taken in conjunction with the accompanying drawings in which:

Figure 1 is a cross-sectional view of a combined hydraulic clutch and transmission mechanism embodying the principles of the present invention and taken at right angles to the axes of the driving and driven members, that is, along line 1—1 of Figure 2;

Figure 2 is a longitudinal cross-sectional view taken along the line 2—2 of Figure 1;

Figure 3 is an enlarged fragmentary longitudinal cross-sectional view showing more clearly the central portion of the structure of Figure 2, illustrating the position of parts when the rotating eccentric is at rest;

Figure 4 is a longitudinal cross-sectional view taken along line 4—4 of Figure 1 to show more clearly the sliding pressure blocks; and, Figure 5 is a perspective view, shown partly broken away, of the mechanism shown in Figures 1 to 4, inclusive.

Figure 5:
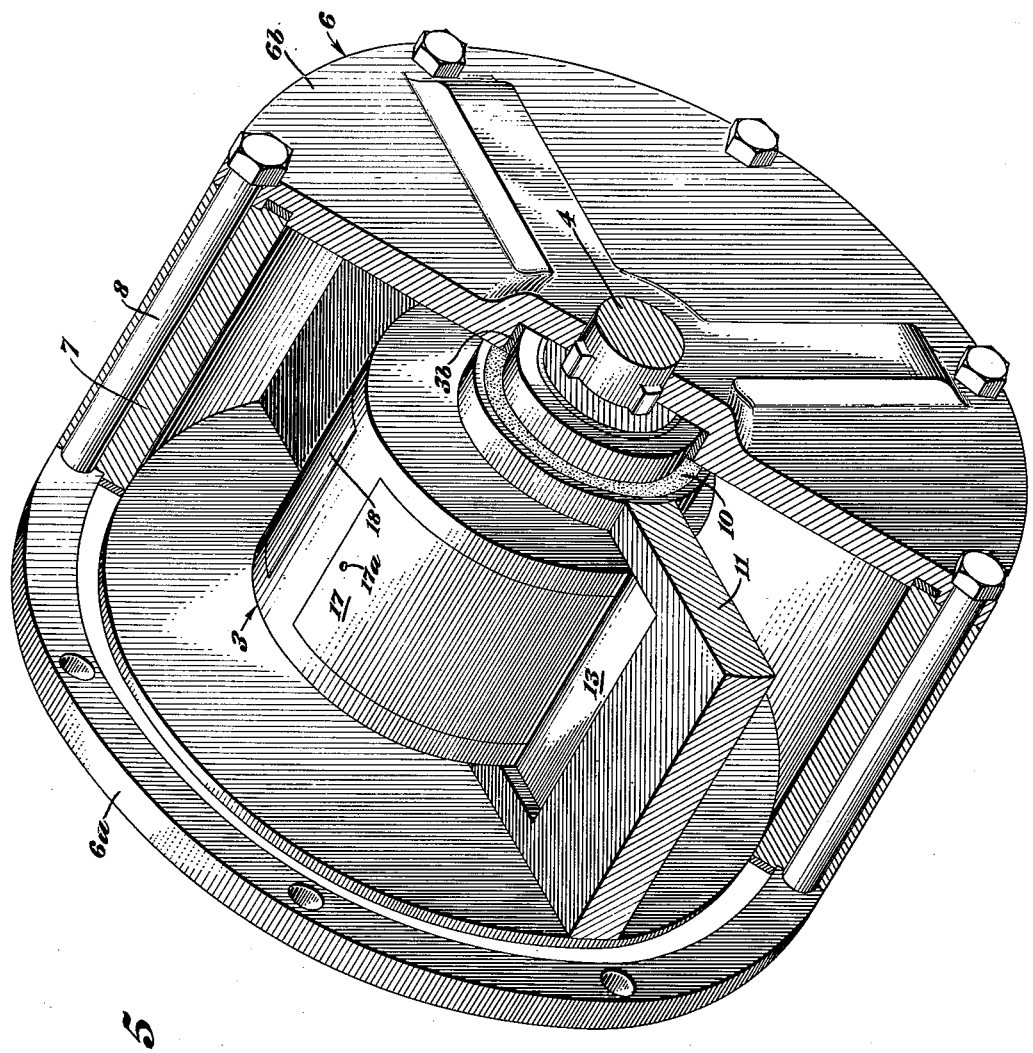

Referring more particularly to the figures, numeral 1 denotes a driving or driver shaft which may be connected to any suitable source of motive power or prime mover, such as a gasoline engine or electric motor. Shaft 1 is directly connected by means of splines or keys 2 to an eccentrically mounted inner drum or rotating eccentric 3. The rotating eccentric 3 is in a form of a circular drum whose axis is offset with respect to that of the drive shaft 1. A portion of reduced diameter 2a of the drive shaft is preferably fitted in a hole bored axially of the driven shaft 4 and may be surrounded by bearing 4a. Such arrangement adds to the rigidity of the unit but is not necessary. Rigidly secured to the driven shaft 4 by means of splines or keys such as 5 is an outer drum 6 which is filled with oil or other suitable hydraulic liquid. The outer drum 6 may be of any suitable construction, for example, it may comprise end plates 6a and 6b bolted together and to a cylindrical plate 7 by means of bolts 8. There is no mechanical connection between the inside and outside drums.

In order to provide an oil-tight seal between the inner and outer drums 3 and 6, respectively, suitable gaskets 9 and 10 are provided on end flanges integrally formed on inner drum 3. Such gaskets may be of the split type and may be seated in concentric grooves so that upon development of high oil pressure the lips of the gasket would become more tightly pressed against the adjoining surfaces.

Sleeves or bearings 3a and 3b are provided between the inner and outer drums to permit free relative rotation, also the radially outward force developed in the outside drum is neutralized by applying it to the inner drum or eccentric. This stabilizes the positions of the outer and inner drums during operation of the mechanism.

Integrally secured to the cylindrical plate 7 of the outer drum are a pair of radially extending stationary plates 11 and 12, having grooves therein into which are slidable, radially movable plates 13 and 14, respectively, which plates are normally biased into engagement with the surface of the rotating eccentric 3 at all times by means of springs 15 and 16, respectively, contained in the grooves. It will be seen therefore that the stationary and movable plates effectively divide the space between the outer and inner drums into two compartments whose volumes will vary as the result of rotation of eccentric 3. That is, as the lobe of the eccentric enters one of the semi-circular chambers or compartments, it reduces the volume thereof and squeezes or tends to compress the liquid oil contained therein developing a pressure pulse which is transmitted to the outer drum as will be described hereinafter.

If no other structure were provided than that described the oil pressure might assume abnormal and explosive proportions, or would cause the whole unit to rotate as one piece as in a hydraulic clutch. To prevent this possibility and to control the oil pressure at all times, substantially radially slidable blocks 17 and 18 are provided along a portion of the surface of eccentric 3, which blocks have arcuate working surfaces conforming to the periphery of the rotating eccentric and act in effect as pistons for developing liquid pressure in the respective semi-circular chambers. Blocks 17 and 18 have integrally secured to the rear central portions thereof arms 19 and 20 respectively having at the free ends thereof integrally formed T-shaped ends 21 and 22 respectively which are slidable in correspondingly T-shaped slots, such as 21a formed in the periphery of a slidable cam 23. The slidable cam 23 is generally of the shape of a truncated cone which encircles and is slidable along the drive shaft portion 2a. A helical spring 24 encircling the drive shaft portion 2a normally biases cam 23 toward the left, as viewed in Figure 2, so as to cause arms 19 and 20 and their respective T-shaped ends to move substantially radially inwardly to the full line position shown in Figure 3, pulling sliding blocks 17 and 18 radially inwardly; therefore, allow escape of oil from one semi-circular chamber to the other underneath slidable plates 13 and 14; that is, for example, from the high pressure chamber shown at the top of Figure 1 to the low pressure chamber shown at the bottom thereof. It will be noted that plates 13 and 14 always ride along the end peripheral portion of the outer surface of eccentric 3 thereby allowing an oil escape opening to form between the slidable plates 13 and 14 and blocks 17 and 18. The operation of the device hereinabove described is as follows:

Assume that the device is installed on a vehicle and that driven shaft 4 and the vehicle are at rest. As the driving shaft 1 is rotated by the engine it will rotate eccentric 3 mechanically coupled thereto. Since the movable plates 13 and 14 are spring pressed against the peripheral surface of the rotating eccentric 3, there will at all times be provided two separate semi-circular chambers. As the lobe portion of eccentric 3 enters these chambers in succession (it being shown extending into the upper chamber in Figure 1) it will cause a reduction of the volume in the respective chambers, therefore squeezing or tending to compress the oil in the chamber thereby developing substantial pressure. As the pressure tends to become excessive, it will force pressure blocks 17 and 18 radially inwardly so as to allow escape of the oil from the high pressure to the low pressure chamber, that is, from the upper chamber to the lower chamber when the parts are as illustrated in Figure 1, the oil flowing under the movable plates 13 and 14. Since the two blocks 17 and 18 are mechanically coupled by means of their T-slot connections to cam 23, they provide the same sized oil escape openings, in view of the fact that they are at the same distance or positions relative to the outside surface of the eccentric. The oil will thus flow back and forth between compartments through these openings. The V-shaped portion 3c of the rotating eccentric may be provided with grooves 3d to permit transfer of liquid between chambers even when the slidable plate rides on portion 3c.

As the rotating eccentric 3 is rotated by the driving shaft, centrifugal force tends to cause sliding blocks 17 and 18 to move substantially radially outwardly so as to compress the liquid contained in the respective chambers. The oil pressure is built up in one oil compartment at a time, that is, as the eccentric rotates it squeezes or reduces the volume of one chamber while increasing that of the other. During each half revolution the volume of one oil compartment will change from a maximum to a minimum. During the next half revolution such oil compartment will change from a minimum to a maximum volume again. Thus, an unbalanced force would be created which will cause the outside drum 6 to rotate by virtue of the fact that there is a difference in total areas of the two sets of plates (stationary and movable) which divide the oil compartments. The net pressure on these sets of plates will be in a given direction and will cause a series of impulses on the plates which in turn will effect rotation of the outer drum and driven shaft 4.

During rapid rotation of the eccentric, the blocks 17 and 18 will ultimately reach a position of equilibrium.

When the driving shaft is stopped, the blocks are automatically moved radially inwardly, from the dotted to the full line position shown in Figure 3, by means of biasing spring 24 so that channels or openings will be provided for oil to flow underneath plates 13 and 14 from one compartment to the other. When the unit is in this condition, no power can be developed because every time the oil pressure builds up it will be relieved. Such can be the case if centrifugal force does not act on the sliding blocks to push them outwardly.

The essential theory or key to the operation of the power converter involving the present invention, lies in the balancing of centrifugal force of the sliding blocks against the oil pressure developed by the rotating eccentric which transmits torque to the driven shaft. The oil pressure is balanced against the speed of the driving shaft and oil is allowed to flow if the pressure can overcome the centrifgal force of the depressible blocks. When the centrifual force is great, the oil pressure may be great. When the rotating eccentric turns rapidly a high oil pressure is developed in cycles which occur twice each revolution, since there are two oil compartments acting ultimately as high pressure compartments. The successive power impulses continually produced during such rotation impart a torque to the driven shaft.

When the driven shaft has been brought up to the speed of the driving shaft which is done smoothly since all power is transmitted solely through oil, the centrifugal force on the sliding blocks is great, whereas the oil pressure required to maintain rotation is moderate. The unit is then in an operating position wherein there are practically no moving parts.

An arcuate oil space is provided under each sliding block so that when the blocks are moved radially inwardly they will occupy such space, but when they move radially outwardly the oil will flow through and underneath them through holes 17a and 18a extending through the blocks. In this manner, the total amount of oil required inside the power converter is constant. These holes in the sliding blocks also help even out the position of the sliding blocks and even out the inward force exerted by the oil pressure.

The power converter described can serve a variety of applications simply by changing the weight of the sliding blocks. Such simple modification changes the output of the power converter because of the increased effect of centrifugal force.

The power converter is compensating in its action because as more power is required of it the driving shaft of the engine or prime mover supplying the power will be allowed to turn faster. When the speeds of both shafts are the same, that is, when the output or driven shaft has been brought up to the speed of the driving shaft, then the power converter rotates as a unit with no relatively moving parts therein which would cause wear.

The power converter embodied in the present invention is particularly adaptable for use in electric motor drives and internal combustion engine drives. Such unit has a great variety of possible uses. If used in an automobile it can replace the conventional transmission and clutch and would have the outstanding advantage of allowing the engine to rotate rapidly enough to develop maximum horsepower even during starting. Although a reverse gear would still be needed, there would nevertheless be a tremendous saving in the total number of parts required. The power converter of the present invention is also useful in tractors, well drilling apparatus and a host of other uses wherever rotating machinery is required. With slight modification, it may be used to advantage in mining, that is, on mining elevators, particularly since it is adaptable to hold a constant rate of descent of the elevator and also act as a transmission when the elevator is being raised.

Thus it will be seen that I have provided a relatively simple and inexpensive hydraulic power converter unit which takes the place of a standard clutch and transmission, such as used on an automobile, for example, which unit is effective to convert rotative mechanical power of the driving shaft into a lower rotative speed and higher torque of the driven shaft and to do so smoothly, with minimum friction loss, and with development of maximum horsepower derived from the prime mover. I am aware that various modifications will be readily suggested to those skilled in the art, after having had the benefit of the teachings of the present specification such as the provision of more than two chambers, or a different arrangement of slidable plates, etc., which modifications come within the purview and spirit of the present invention. Hence, I do not wish that the invention be limited except insofar as is set forth in the following claims.

What I claim is:

1. A unitary hydraulic clutch and transmission unit comprising a driving member, a driven member, a hollow drum rigidly connected to the driven member, a second hollow drum eccentrically mounted with respect to and inside said first hollow drum in a liquid-tight manner, a body of liquid contained in the space between said drums, a plurality of radially extending partition walls including radially inwardly biased slidable portions disposed between said drums to divide the space into two semi-circular compartments, said eccentrically mounted hollow drum effecting alternate pressure impulses in said compartments which are transmitted to said partition walls and, in turn, to said outer drum and driven member, said eccentrically mounted hollow drum having movable peripheral wall portions, means normally resiliently biasing said movable wall portions radially inwardly of said eccentrically mounted drum to provide liquid escape openings between said compartments, and means under influence of centrifugal force of said driving member to oppose the inwardly biasing force on said movable wall portions and vary the liquid escape openings proportional to centrifugal force of said driving member.

2. A unitary hydraulic power converter comprising a container having an eccentric rotatably mounted therein, means for sealing the relatively movable parts of said container and eccentric, the space between said container and said eccentric being filled with liquid, means for continuously dividing said space into two chambers irrespective of the position to which the eccentric is rotated so as to cause alternate pressure surges in said chambers in succession, a drive shaft rigidly connected to said eccentric and a driven shaft rigidly connected to said container for transmitting torque as the result of unbalanced liquid pressure exerted on the areas of said partitioning members as a consequence of rotation of said eccentric, said eccentric having movable peripheral wall portions, means normally resiliently biasing said peripheral wall portions radially inwardly of said eccentric to provide liquid escape openings between said two chambers, and means under influence of centrifugal force of said driven shaft to oppose the inwardly biasing force on said peripheral wall portions and vary the escape openings proportional to centrifugal force of said drive shaft.

3. A unitary hydraulic clutch and transmission unit comprising a driving member, a driven member, a hollow drum rigidly connected to the driven member, a second hollow drum eccentrically mounted with respect to and inside said first hollow drum in a liquid-tight manner, a body of liquid contained in the space between said drums, and a plurality of radially extending partition walls including radially inwardly biased slidable portions disposed between said drums to divide the space into two semi-circular compartments, said eccentrically mounted hollow drum effecting alternate pressure impulses in said compartments which are transmitted to said partition walls and, in turn, to said outer drum and driven member, said eccentrically rotatable inner drum including radially inwardly depressible sliding block means having an arcuate surface conforming to the outer surface of the inner drum to allow escape of liquid from one semi-circular compartment to the other between said sliding block means and slidable partition wall portion upon attainment of predetermined pressure.

4. A unitary hydraulic clutch and transmission unit comprising a driving member, a driven member, a hollow drum rigidly connected to the driven member, a second hollow drum eccentrically mounted with respect to and inside said first hollow drum in a liquid-tight manner, a body of liquid contained in the space between said drums, and a plurality of radially extending partition walls including radially inwardly biased slidable portions disposed between said drums to divide the space into two semi-circular compartments, said eccentrically mounted hollow drum effecting alternate pressure impulses in said compartments which are transmitted to said partition walls and, in turn, to said outer drum and driven member, said inner, concentrically rotatable, drum having a pair of peripherally cut out portions, radially inwardly extending arms integrally formed on said portions to provide piston-like members, and a cam substantially the shape of a truncated cone concentrically disposed and longitudinally slidable with respect to said drive shaft and having grooves disposed longitudinally of the outer surface for engaging the ends of said arms for longitudinally slidable movement so as to allow the arms to move radially inwardly to depress said arcuate blocks in response to attainment of a high predetermined pressure in said compartments and thereby provide a liquid escape opening between compartments disposed between said cut out portions and said slidable partition portions.

5. A unitary hydraulic power converter comprising a container having an eccentric rotatably mounted therein, means for sealing the relatively movable parts of said container and eccentric, the space between said container and said eccentric being filled with liquid, means for continuously dividing said space into two chambers irrespective of the position to which the eccentric is rotated so as to cause alternate pressure surges in said chambers in succession, a drive shaft rigidly connected to said eccentric and a driven shaft rigidly connected to said container for transmitting torque as the result of unbalanced liquid pressure exerted on the areas of said partitioning members as a consequence of rotation of said eccentric, said eccentric having a plurality of cut-away portions along its periphery integrally secured to radially inwardly extending arms forming piston like members which are depressible in response to attainment of a predetermined pressure in said chambers and means for simultaneously moving said piston like members radially inwardly when said driven member is at rest.

6. Apparatus recited in claim 4 together with a spring for normally biasing said cam longitudinally in a direction so as to cause radially inward movement of said arms and thereby provide a liquid escape opening when the driven shaft is at rest.

7. Apparatus recited in claim 5 wherein said arcuate cut away portions are provided with grooves for allowing liquid to flow thereunder as the cut away portions are moved radially outwardly under the action of centrifugal force of the driving member.

GEORGE H. RAMSEY.

REFERENCES CITED

The following references are of record in the file of this patent:

UNITED STATES PATENTS

| Number | Name | Date |
| --- | --- | --- |
| 1,149,970 | Taft | Aug. 10, 1915 |
| 2,175,970 | Perkins | Oct. 10, 1939 |
| 2,238,786 | Warman | Apr. 15, 1941 |
| 2,313,049 | Cook | Mar. 9, 1943 |
| 2,052,429 | Tyler | Aug. 25, 1946 |
| 2,451,118 | Pyle | Oct. 12, 1948 |